(No Model.)

J. HERR.
BOND FOR ELECTRICAL CONDUCTORS.

No. 521,238. Patented June 12, 1894.

WITNESSES:
Stevenson H. Walsh.
H. H. Rose.

INVENTOR
John Herr
by his attorney
Chas. A. Rutter.

THE NATIONAL LITHOGRAPHING COMPANY,
WASHINGTON, D. C.

UNITED STATES PATENT OFFICE.

JOHN HERR, OF PHILADELPHIA, PENNSYLVANIA.

BOND FOR ELECTRICAL CONDUCTORS.

SPECIFICATION forming part of Letters Patent No. 521,238, dated June 12, 1894.

Application filed May 11, 1894. Serial No. 510,829. (No model.)

*To all whom it may concern:*

Be it known that I, JOHN HERR, a citizen of the United States, and a resident of the city and county of Philadelphia, State of Pennsylvania, have invented certain new and useful Improvements in Bonds for Electrical Conductors, of which the following is a specification.

My invention relates to improvements in bonds for connecting electrical conductors, and more particularly to improvements in bonds for connecting a copper wire with a railway rail, and the object of my invention is to furnish a device for this purpose which will be simple and inexpensive in construction, which may readily be secured to both the wire and rail without injury to either of them, and which will insure a perfect electrical connection between the wire and rail.

My bond consists of a split tapered bolt which is furnished with a hole passing longitudinally through its center and the exterior end of the shank of which is threaded and which is furnished with a head adapted to be grasped by a wrench or spanner, and of a nut adapted to be screwed up on the tapered shank of said bolt in order to close said bolt down upon the wire and to hold said bolt in place upon the rail.

The bond is preferably secured to the web of the rail, which is furnished with a tapered hole to receive the tapered shank of the bolt. The wire is passed into the longitudinal hole in the bolt and the nut placed upon that part of the shank of the bolt which projects through the web and is screwed up until it engages one side of the web and draws the head of the bolt against the other side of the web; at the same time, owing to the split construction of the bolt, the hole in this latter is contracted and its sides firmly grasp the wire. After the nut has been screwed home that part of the shank which projects through the nut is upset so as to form a lock for securing the nut in place.

Figure 1:
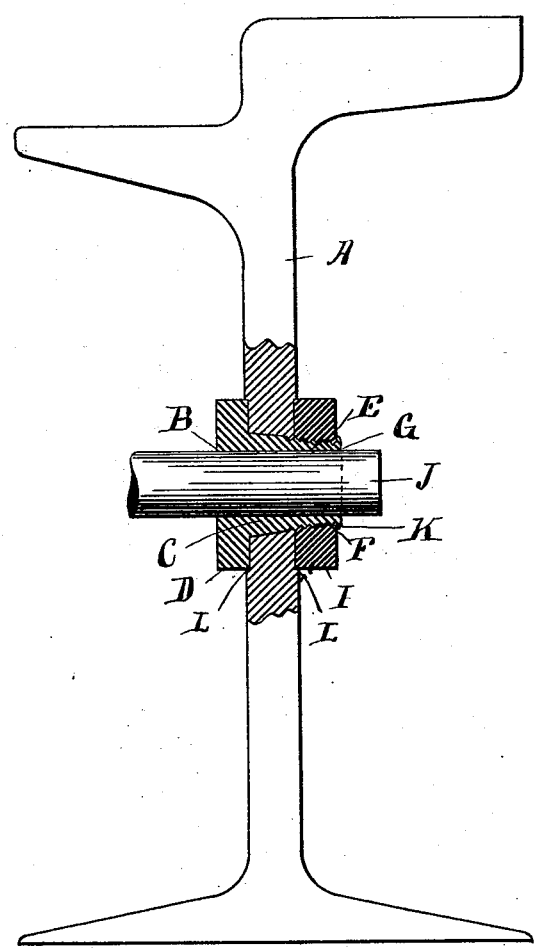
Figure 2:
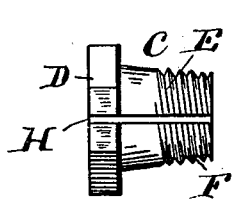
Figure 3:
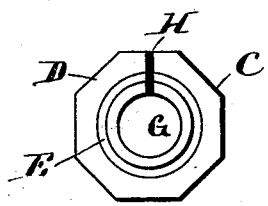
Figure 4:
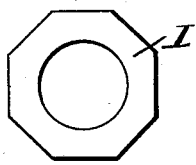

In the accompanying drawings forming part of this specification and in which similar letters of reference indicate similar parts throughout the several views, Figure 1, is an end elevation of a railway rail, partly in section, with my bond attached, the latter being shown in central sectional elevation; Fig. 2, a side elevation of the tapered bolt; Fig. 3, a front elevation of the same, and Fig. 4, a front elevation of the nut.

A is the rail. B a tapered hole in the web of the rail. C a bolt having a head D and a tapered shank E which is externally threaded as shown at F and which is furnished with a hole G passing longitudinally through its center, and which is split from end to end as shown at H.

I is a nut adapted to be screwed up on the thread on the tapered shank.

J is a copper wire adapted to pass into hole G in bolt C and to be grasped and held by this bolt.

In applying my bond to the rail or other large conductor, the tapered shank of the bolt is passed into the tapered hole in the conductor, the wire J having been already passed through the bolt or being passed through it after it is in place in the conductor, the nut is now placed upon the thread on the shank of the bolt and screwed up until both it and the head of the bolt firmly engage the sides of the web of the rail or conductor after which the end of the bolt may be turned over on the nut, as shown at K, Fig. 1, in order to lock the nut in place.

In order to insure a perfect contact between the head of the bolt and the nut and the rail or conductor, this latter may be faced off as indicated at L, Fig. 1.

The wire J, the head of the bolt and the nut, may be painted or covered with some non-conducting paint or material if desired.

Having thus described my invention, I claim as new and desire to secure by Letters Patent—

The combination with an electrical conductor, of a tapered hole therein, a split bolt having a head and a conical shank externally threaded and a hole passing longitudinally through said head and shank, a nut adapted to be screwed up on said conical shank of said bolt, and a wire adapted to enter and be grasped by the sides of said hole in said bolt.

JOHN HERR.

Witnesses:
STEVENSON H. WALSH,
CHAS. A. RUTTER.